United States Patent
Nakao (10) Patent No.: US 9,124,838 B2
(45) Date of Patent: Sep. 1, 2015

(54) DOCUMENT READING DEVICE AND IMAGE FORMING APPARATUS

(71) Applicant: KYOCERA Document Solutions Inc., Osaka (JP)

(72) Inventor: Mitsutoshi Nakao, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/555,054

(22) Filed: Nov. 26, 2014

(65) Prior Publication Data

US 2015/0146266 A1    May 28, 2015

(30) Foreign Application Priority Data

Nov. 28, 2013   (JP) .................................. 2013-246186

(51) Int. Cl.
  *H04N 1/04*    (2006.01)
  *H04N 1/387*   (2006.01)
  *G06K 9/00*    (2006.01)

(52) U.S. Cl.
  CPC .......... *H04N 1/3872* (2013.01); *G06K 9/00456* (2013.01); *H04N 1/3871* (2013.01)

(58) Field of Classification Search
  None
  See application file for complete search history.

(56) References Cited

U.S. PATENT DOCUMENTS

| 5,666,214 A * | 9/1997 | MacKinlay et al. .......... 358/453 |
| 5,821,931 A * | 10/1998 | Berquist et al. .............. 715/784 |
| 7,904,827 B2 * | 3/2011 | Taniguchi et al. ............ 715/788 |
| 2008/0225319 A1 * | 9/2008 | Takada ........................ 358/1.12 |
| 2011/0029855 A1 * | 2/2011 | Morita ......................... 715/233 |
| 2011/0115825 A1 * | 5/2011 | Tetsuhashi ................... 345/672 |
| 2013/0135688 A1 * | 5/2013 | Link et al. .................... 358/449 |

FOREIGN PATENT DOCUMENTS

JP    2000-222394    8/2000

\* cited by examiner

*Primary Examiner* — Dung Tran
(74) *Attorney, Agent, or Firm* — Knobbe, Martens, Olson & Bear LLP (57) ABSTRACT

A document reading device includes a document reading section, an image memory, and an image processing section. The image processing section is configured to retrieve an image of an original document from the image memory and process the image. The image processing section includes: a mark recognizing section configured to recognize an image of a predetermined mark made on the original document; a sticky note recognizing section configured to recognize an image of a sticky note placed on a predetermined position of the original document relative to the mark; a mask determining section configured to determine in which mask pattern the mark is masked with the sticky note; and an image manipulating section configured to manipulate the image of the sticky note according to the mask pattern determined by the mask determining section.

11 Claims, 6 Drawing Sheets

| | [DESCRIPTION] | [ACTION IN DIGITIZATION] |
|---|---|---|
| 1. | COMMENT IS ALREADY DEALT WITH | ADD "DONE" IN FRONT OF STICKY NOTE COMMENT |
| 2. | COMMENT IS NOT YET DEALT WITH | TURN COMMENT CONTENT RED |
| 3. | COMMENT CONTENT IS UNCLEAR | ADD "???" IN FRONT OF STICKY NOTE COMMENT |

DOCUMENT READING DEVICE AND IMAGE FORMING APPARATUS

INCORPORATION BY REFERENCE

This application claims priority to Japanese Patent Application No. 2013-246186 filed on Nov. 28, 2013, the entire contents of which are incorporated by reference herein.

BACKGROUND

The present disclosure relates to a document reading device for use to digitize a paper document and an image forming apparatus with the same and particularly relates to a technique for optically reading an image of a paper document with a sticky note placed thereon and manipulating an image of the sticky note.

Sticky notes, which are small paper slips capable of being attached on any place, are widely used in offices, houses, and other locations. Particularly owing to their capability of multiple detachment and reattachment, sticky notes are often used as notes of comments or the like in a manner that they are placed on paper documents or the like.

In optically reading an image of a document (original document) with a sticky note placed thereon to digitize the document, it may be desirable in some cases, not to digitize the entire original document as a single image, but to handle the sticky note given additional information and the body of the original document separately from each other. For example, a technique is disclosed in which in digitizing an original document with a sticky note placed thereon, information given to the sticky note is digitized separately from the body and shared among a plurality of persons.

SUMMARY

A technique improved over the aforementioned technique is proposed as one aspect of the present disclosure.

A document reading device according to an aspect of the present disclosure includes a document reading section, an image memory, and an image processing section.

The document reading section is configured to optically read an image of an original document.

The image memory is configured to temporarily store the image read by the document reading section.

The image processing section is configured to retrieve the image of the original document from the image memory and process the image. The image processing section includes a mark recognizing section, a sticky note recognizing section, a mask determining section, and an image manipulating section.

The mark recognizing section is configured to recognize an image of a predetermined mark made on the original document.

The sticky note recognizing section is configured to recognize an image of a sticky note placed on a predetermined position of the original document relative to the mark.

The mask determining section is configured to determine in which mask pattern the mark is masked with the sticky note.

The image manipulating section is configured to manipulate the image of the sticky note according to the mask pattern determined by the mask determining section.

An image forming apparatus according to another aspect of the present disclosure includes the aforementioned document reading device and an image forming section.

The image forming section is configured to form an image on a recording medium using the image of the original document read by the document reading device.

DETAILED DESCRIPTION

Figure 1:
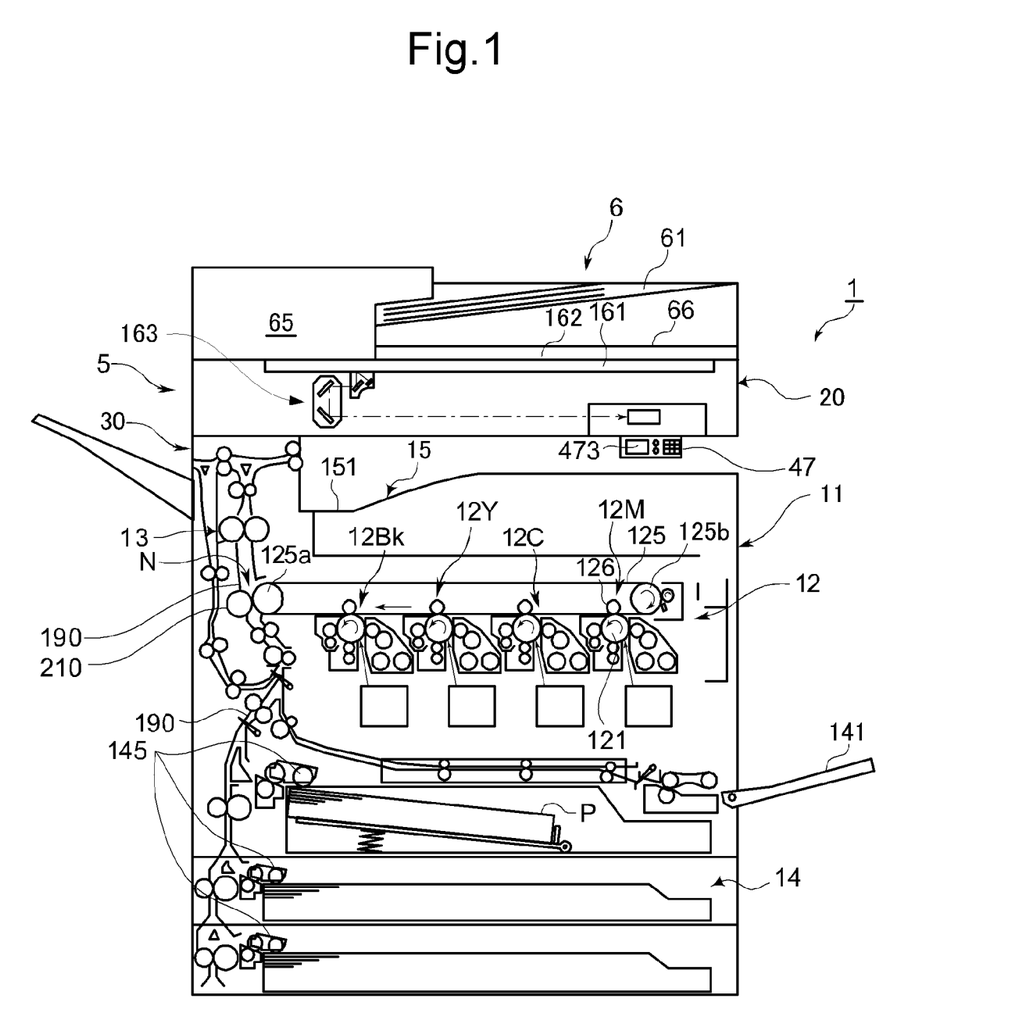
FIG. 1 is a front cross-sectional view showing the structure of an image forming apparatus according to one embodiment of the present disclosure.

Hereinafter, a description will be given of an image forming apparatus according to one embodiment of the present disclosure with reference to the drawings. FIG. 1 is a front cross-sectional view showing the structure of an image forming apparatus according to one embodiment of the present disclosure. The image forming apparatus 1 is a multifunction peripheral having multiple functions including, for example, a copy function, a print function, a scan function, and a facsimile function.

The image forming apparatus 1 is roughly composed of an apparatus body 11, a document reading device 20 opposed to and above the apparatus body 11, and a connecting portion 30 provided between the document reading device 20 and the apparatus body 11.

The document reading device 20 is supported at the top end of the connecting portion 30. The document reading device 20 includes a document reading section 5 and a document conveyance section 6.

The document reading section 5 includes an original glass plate 161 which is fitted to the top of an opening in a housing of the document reading section 5 and on which an original document is to be placed. The original glass plate 161 includes: a fixed document reading portion (not shown) for use in reading an original document placed thereon; and a conveyed document reading portion (not shown) for use in reading an original document being conveyed by the document conveyance section 6. The document reading section 5 further includes: an openable/closable original cover 162 capable of holding the original document placed on the fixed document reading portion of the original glass plate 161; and a reading unit 163 for reading an image of the original document placed on the fixed document reading portion of the original glass plate 161 and an image of the original document being conveyed across the conveyed document reading portion of the original glass plate 161. The reading unit 163 optically reads the image of the original document using an image sensor, such as a CCD (charge coupled device) or a CMOS (complementary metal oxide semiconductor), to generate image data.

The document conveyance section 6 includes a document loading chute 61 on which to-be-read original documents are to be placed, a document ejection portion 66 to which already read original documents are to be ejected, and a document conveyance mechanism 65. The document conveyance mechanism 65 includes an unshown sheet feed roller, an unshown conveyance roller, and an unshown sheet reversing mechanism. The document conveyance mechanism 65 is configured to feed the original documents placed on the document loading chute 61 sheet by sheet by the drive of the sheet feed roller, convey the document to the conveyed document reading portion of the original glass plate 161 by the drive of the conveyance roller to allow the reading unit 163 to read the document, and then eject it to the document ejection portion 66. Furthermore, the document conveyance mechanism 65 allows the sheet reversing mechanism to reverse the side of the original document and conveys the document to the conveyed document reading portion of the original glass plate 161 again to allow the reading unit 163 to read not only one side of the document but also the other side thereof.

Moreover, the document conveyance section 6 is pivotally mounted to the document reading section 5 so that its front side can move upward. When the front side of the document conveyance section 6 is moved up to make the top surface of the original glass plate 161 as a document table open, the user can place, on the top surface of the original glass plate 161, a to-be-read original document, for example, an open book with facing pages.

An operating section 47 is disposed at the front of the document reading device 20. The operating section 47 is configured to receive operator's commands for various types of operations and processing executable by the image forming apparatus 1, such as a command to execute an image forming operation and a command to execute a document reading operation. The operating section 47 includes a display 473 configured to display operation guidance and so on for the operator.

The apparatus body 11 is made up to include an image forming section 12, a fixing section 13, a paper feed section 14, a paper output section 15, and so on.

In a document reading operation of the image forming apparatus 1, the document reading section 5 optically reads an image of an original document being conveyed by the document conveyance section 6 or an image of an original document placed on the original glass plate 161 to generate image data. The image data generated by the document reading section 5 is stored on an internal HDD (hard disk drive), a network-connected computer or the like.

In an image forming operation of the image forming apparatus 1, the image forming section 12 forms a toner image on a paper sheet P serving as a recording medium fed from the paper feed section 14, based on image data generated by the document reading operation, image data received from a network-connected computer or a user terminal, such as a smartphone, or image data stored on the internal HDD. Each of image forming units 12M, 12C, 12Y, and 12Bk of the image forming section 12 includes a photosensitive drum 121, a developing device operable to supply toner to the photosensitive drum 121, a toner cartridge for holding toner, a charging device, an exposure device, and a primary transfer roller 126.

In the case of color printing, the image forming unit 12M for magenta, the image forming unit 12C for cyan, the image forming unit 12Y for yellow, and the image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125 mounted around a drive roller 125a and a driven roller 125b.

The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly travels between the drive roller 125a and the driven roller 125b while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125a with the intermediate transfer belt 125 in between, to a paper sheet P conveyed from the paper feed section 14 along a conveyance path 190. Thereafter, the fixing section 13 fixes the toner image on the paper sheet P by the application of heat and pressure. The paper sheet P having a multicolor image fixed thereon by the completion of the fixing treatment is discharged to a paper output tray 151.

The paper feed section 14 includes a plurality of paper feed cassettes including a manual feed tray 141. A control section (see FIG. 2) rotationally drives a pick-up roller 145 of the paper feed cassette containing paper sheets of the size designated by an operator's command and thereby allows the pick-up roller 145 to feed a paper sheet P contained in the paper feed cassette toward the nip N.

Figure 2:
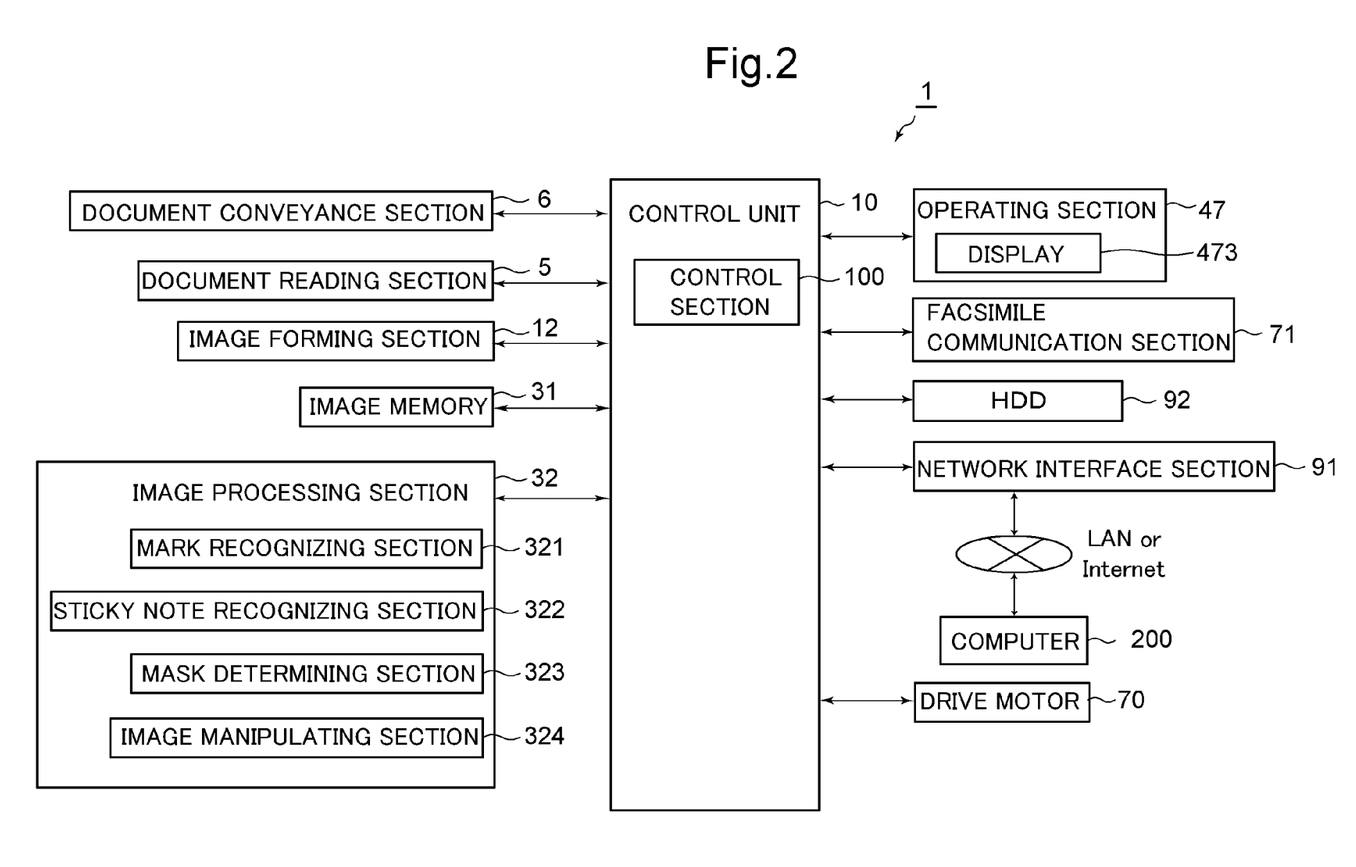
FIG. 2 is a functional block diagram schematically showing an essential internal configuration of the image forming apparatus.

Next, a description will be given of the structure of the image forming apparatus 1. FIG. 2 is a functional block diagram showing an essential internal configuration of the image forming apparatus 1.

The image forming apparatus 1 includes a control unit 10. The control unit 10 is composed of a CPU (central processing unit), a RAM, a ROM, a dedicated hardware circuit, and so on and governs the overall operation control of the image forming apparatus 1.

The document reading section 5 is under the control of the control unit 10 and includes the aforementioned reading unit 163 including a lighting part, a CCD sensor, and so on. The document reading section 5 is configured to read an image from an original document by irradiating the document with light from the lighting part and receiving the reflected light on the CCD sensor and generate electronic data (digitize the image).

An image memory 31 provides a region for temporarily storing data of image of the original document read by the document reading section 5 and temporarily storing data to be printed by the image forming section 12.

The image processing section 32 is configured to retrieve from the image memory 31 the image of the original document read by the document reading section 5 and process the image. For example, in order that the image read by the document reading section 5 is improved in quality after the formation of an image in the image forming section 12, the image processing section 32 performs predetermined image processing, such as shading correction. Furthermore, as will be described hereinafter, in digitizing an image of a sticky note, the image processing section 32 performs various manipulations on the image of the sticky note.

A unit composed of the document reading section 5, the image memory 31, and the image processing section 32 corresponds to the document reading device according to the one embodiment of the present disclosure.

The image forming section 12 is configured to form an image of print data read by the document reading section 5, an image of print data received from the network-connected computer 200, or the like.

The operating section 47 is configured to receive operator's commands for various types of operations and processing executable by the image forming apparatus 1. The operating section 47 includes the display 473, such as a liquid crystal display equipped with a touch panel.

The display 473 is configured to, while the image forming apparatus 1 is in a normal operation mode, display images of various screens, such as an operating screen, a preview screen, and a screen for checking the status of a print job. On the other hand, while the image forming apparatus 1 is in a sleep mode, the display 473 is turned off.

A facsimile communication section 71 includes a coding/decoding section, a modulation/demodulation section, and an NCU (network control unit), all of which are not illustrated, and performs facsimile communication using a public telephone network.

A network interface section 91 is constituted by a communication module, such as a LAN board, and transfers various data to and from computers 200 and the like in a local area via a LAN or the like connected to the network interface section 91.

A HDD 92 is a large storage device capable of storing document images and the like read by the document reading section 5.

A drive motor 70 is a drive source for applying a rotary drive force to various rotary members of the image forming section 12, a conveyance roller pair, and other rotary members.

The control unit 10 includes a control section 100. The control section 100 is connected to the document reading section 5, the document conveyance section 6, the image memory 31, the image processing section 32, the image forming section 12, the operating section 47, the facsimile communication section 71, the network interface section 91, the HDD 92, and so on and controls the operations of these components.

The image processing section 32 includes a mark recognizing section 321, a sticky note recognizing section 322, a mask determining section 323, and an image manipulating section 324.

The mark recognizing section 321 is configured to recognize the image of a predetermined mark made on an original document read by the document reading section 5. The mark is a symbol or sign representing a position where a sticky note is placed on an original document. The mark is made, based on a user's instruction, at any position on the original document by image formation of an image forming apparatus, such as the above image forming apparatus 1.

The sticky note recognizing section 322 is configured to recognize, in the image of the original document acquired by the reading of the document reading section 5, the image of a sticky note placed on a predetermined position of the original document relative to the image showing the mark. The recognition of the image of the sticky note by the sticky note recognizing section 322 is performed, for example, by pattern matching. The sticky note is placed, for example, just to the right of the mark made on the original document by the user. In this case, the sticky note recognizing section 322 recognizes as the image of the sticky note an effective image present just to the right of the mark.

The mask determining section 323 is configured to determine in which mask pattern the mark is masked with the sticky note. The user may mask the mark by placing a sticky note over a portion of the image of the mark on the original document, such as a right half, an upper half or a lower half of the mark image. When this original document is read by the document reading section 5 and the mark image is recognized by the mark recognizing section 321, the mask determining section 323 compares the recognized mark with the original mark. This comparison of the mask determining section 323 is performed by, for example, pattern matching between the recognized mark and the original mark, and the mask determining section 323 determines, based on the shape of a common image portion of the two marks matched in pattern, how the mark is masked with the sticky note, or in which mask pattern the mark is masked with the sticky note.

The image manipulating section 324 is configured to manipulate the image of the sticky note according to the mask pattern determined by the mask determining section 323. The details of the manipulation will be described hereinafter.

Although in this embodiment the mark recognizing section 321, the sticky note recognizing section 322, the mask determining section 323, and the image manipulating section 324 are included in the image processing section 32, they may be included instead in the control unit 10.

Figure 3:
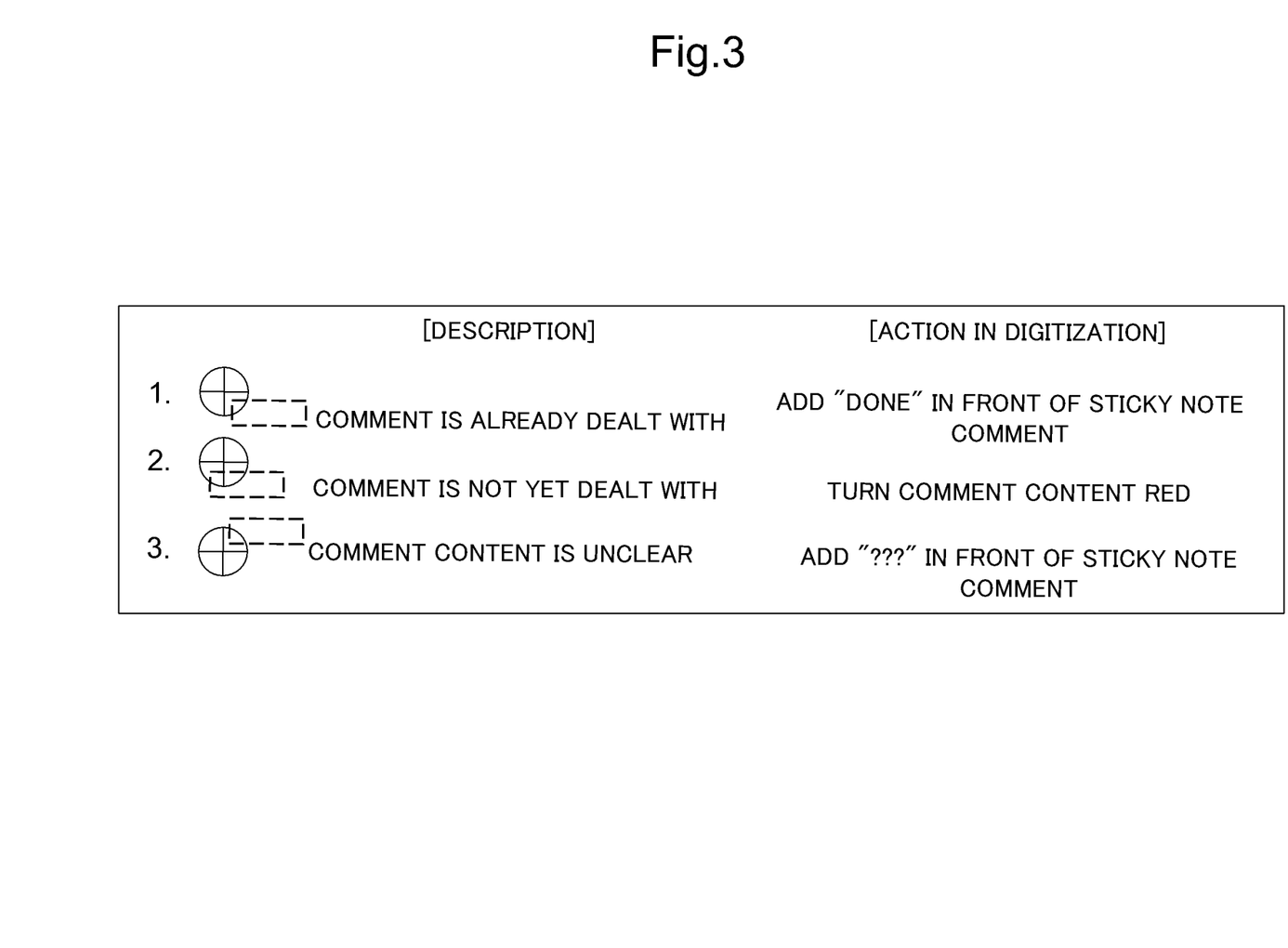
FIG. 3 is a chart for illustrating an example of a set of different manipulations to be performed on an image of a sticky note according to different mask patterns of a mark masked with the sticky note.

FIG. 3 is a chart for illustrating an example of a set of different manipulations to be performed on an image of a sticky note according to different mask patterns of a mark masked with the sticky note. In the example of FIG. 3, a symbol formed of a combination of a circle and a cross is used as the mark. Furthermore, the rectangle of broken lines shown in FIG. 3 represents a sticky note.

For example, if the mask determining section 323 determines that a lower right portion of a mark is masked with a sticky note, the image manipulating section 324 adds, in front of the image of the sticky note, the word "Done" in the form of alphabetical characters or a graphic image. If the mask determining section 323 determines that the lower half of a mark is masked with a sticky note, the image manipulating section 324 turns the text in the image of the sticky note red in the form of alphabetical characters or a graphic image. If the mask determining section 323 determines that an upper right portion of a mark is masked with a sticky note, the image manipulating section 324 adds, in front of the image of the sticky note, the string "???" in the form of characters or a graphic image.

The image manipulating section 324 previously stores the correspondences among such a mark as shown in FIG. 3, its mask patterns, and the respective manners of manipulating an image of a sticky note according to the mask patterns. Specifically, a character or image as desired by the user is stored as the mark in the image manipulating section 324 based on a designation given through a user's operation of the operating section 47 and user-specified mask patterns of the mark and user-specified manners of manipulating the image of the sticky note according to the mask patterns are also stored in the image manipulating section 324. In doing so, if the mark designated by the user is similar to any symbol predetermined to be unsuitable as a mark indicating the position of a sticky note, the image manipulating section 324 may allow the display 473 to display a message to prompt the user to change the mark.

Figure 4:
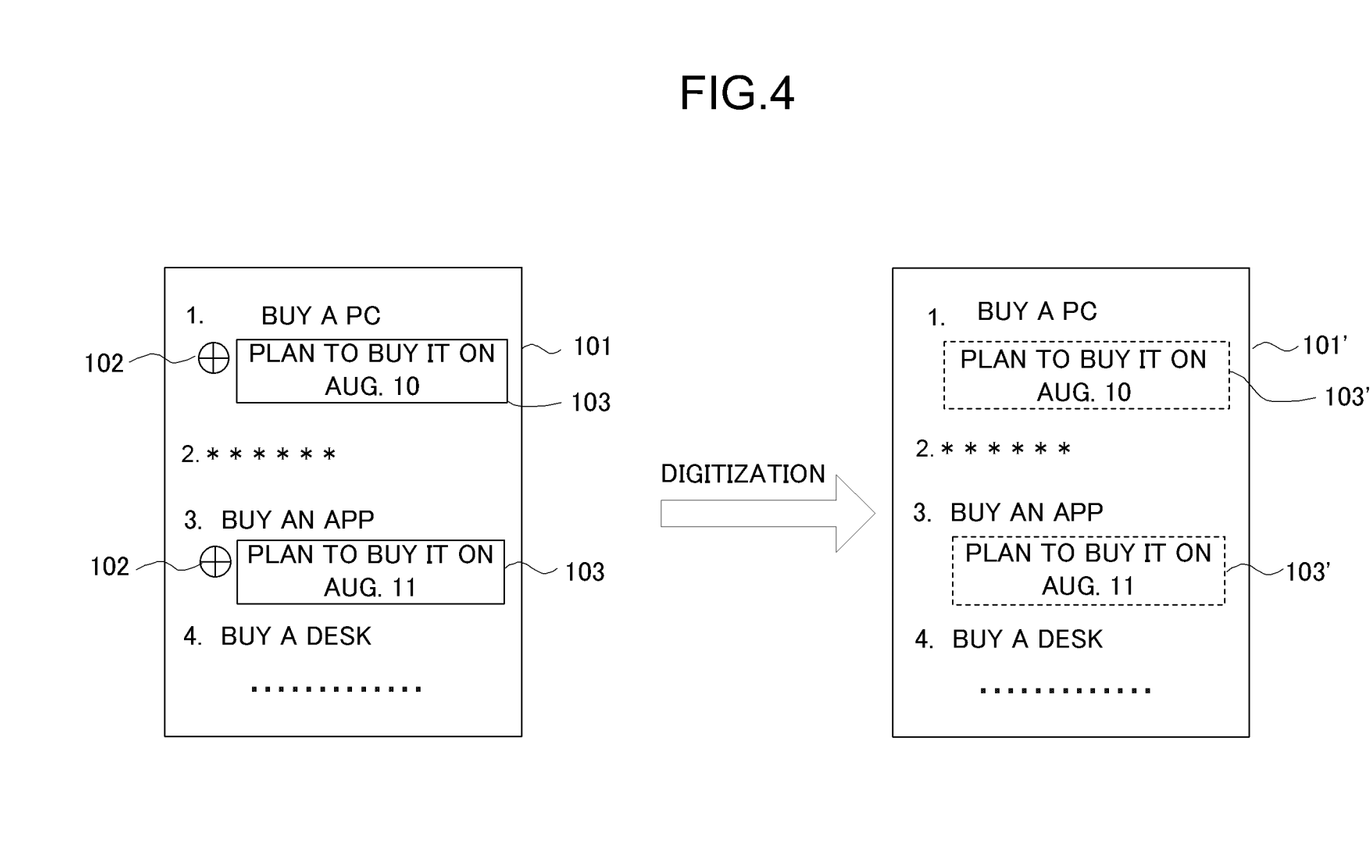
FIG. 4 is a chart showing an example of digitization of an original document with sticky notes placed thereon.

FIG. 4 is a chart showing an example of digitization of an original document with sticky notes placed thereon. As an example, the case will be described where a mark 102 shown in FIG. 4 is stored as the mark in the image manipulating section 324 and processing in the case "not applicable" to any mask pattern of the mark 102 (i.e., where an image of a sticky note is not overlapped with the mark) is to delete the mark and convert the image of the sticky note into characters.

Shown in the left side of FIG. 4 is a state where the marks 102 are made at two points on an original document 101 and sticky notes 103 are placed one just to the right of each mark 102. When during reading of this original document 101 by the document reading section 5 the mark recognizing section 321 recognizes the images of the marks 102, the sticky note recognizing section 322 recognizes the images of the sticky notes 103, and the mask determining section 323 determines that the case is "not applicable" to any mask pattern, the image manipulating section 324 manipulates the read image of the original document 101 into an image in which, as shown by an image 101' in the right side of FIG. 4, the images corresponding to the marks 102 are deleted and the image representing "Plan to Buy it on August 10" and the image representing "Plan to Buy it on August 11" read as the images of the sticky notes 103 are converted into characters.

Since the image manipulating section 324 deletes the images of the marks 102, only images showing really necessary information for the user can be left. This is because the marks 102 are merely signs indicating the fact that sticky notes 103 are placed on the original document 101 and the marks 102 do not particularly need to be digitized.

As shown in the right side of FIG. 4, the image manipulating section 324 may add to the image 101' of the original document 101 graphics enclosing the images 103' of the sticky notes 103 by broken lines or the like. Thus, the contents described on the sticky notes can be emphasized in the image 101' of the original document 101 to facilitate the user's understanding thereof, resulting in further improved user's convenience.

Figure 5:
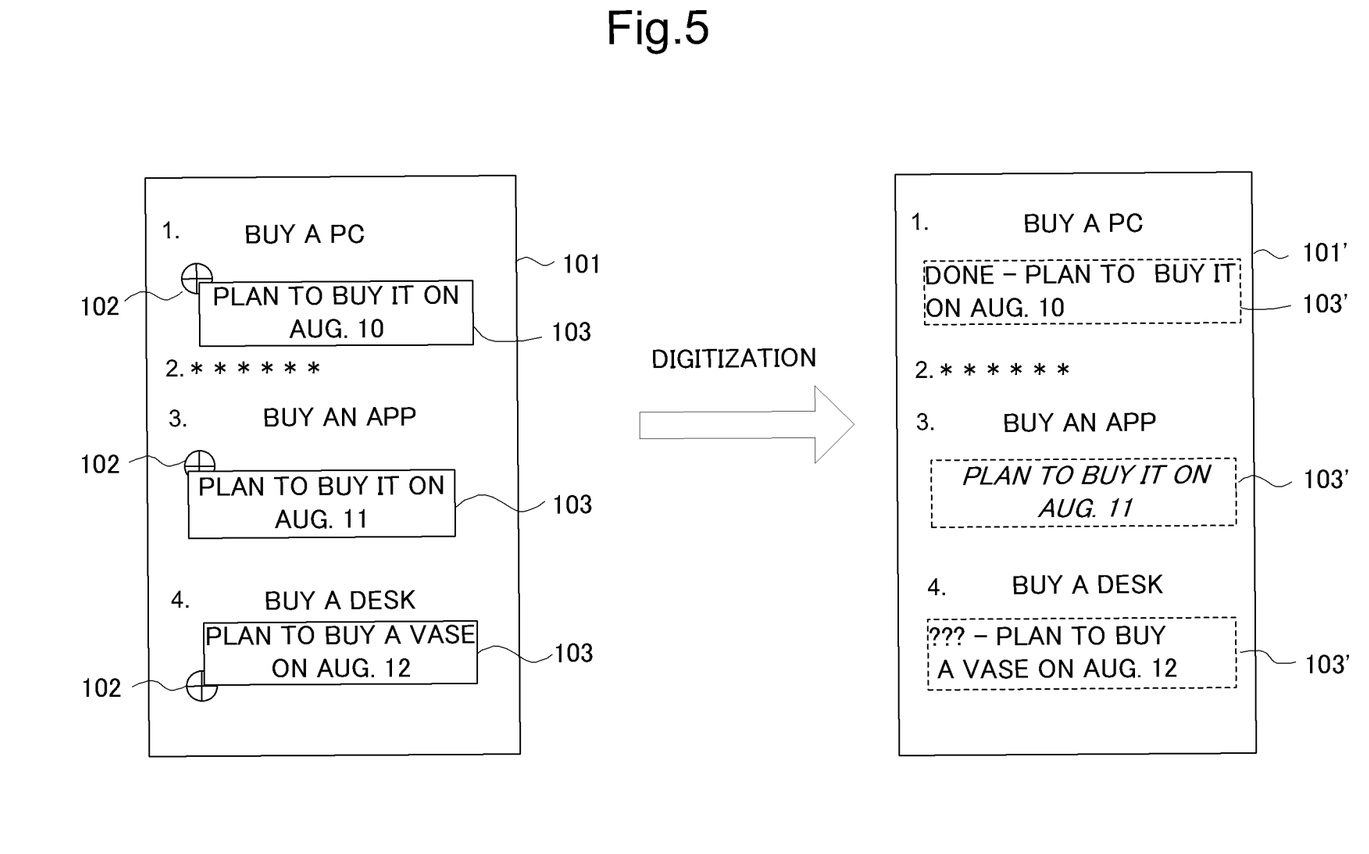
FIG. 5 is a chart showing another example of digitization of an original document with sticky notes placed thereon.

FIG. 5 is a chart showing another example of digitization of an original document with sticky notes placed thereon. An original document 101 shown in the left side of FIG. 5 is one in which the two sticky notes 103 placed on the original document 101 shown in the left side of FIG. 4 are re-placed to mask a portion of each mark 102. For example, suppose that the image manipulating section 324 stores the mark, its mask patterns, and respective manipulation manners associated with the mask patterns, all of which are shown in FIG. 3.

In the original document 101 shown in the left side of FIG. 5, the uppermost sticky note 103 is placed to mask a lower right portion of the mark 102. When during reading of this original document 101 by the document reading section 5 the mark recognizing section 321 recognizes the image of the mark 102, the sticky note recognizing section 322 recognizes the image of the sticky note 103, and the mask determining section 323 determines the mask pattern (case 1. shown in FIG. 3 (the sticky note overlapped with the lower right portion of the mark)), the image manipulating section 324 manipulates the read image of the original document 101 into an image in which, as shown by an upper image 103' of the set of images 101' in the right side of FIG. 5, the image corresponding to the mark 102 is deleted and a graphic image or characters representing the word "Done" are added next to the text "Plan to Buy it on August 10" read as the image of the sticky note 103.

In the original document 101 shown in the left side of FIG. 5, the middle sticky note 103 is placed to mask the entire lower half of the mark 102. In this case, when the mask determining section 323 likewise determines the mask pattern (case 2. shown in FIG. 3 (the sticky note overlapped with the entire lower half of the mark)), the image manipulating section 324 manipulates the read image of the original document 101 into an image in which, as shown by a middle image 103' of the set of images 101' in the right side of FIG. 5, the text "Plan to Buy it on August 11" read as the image of the sticky note 103 is turned red (for convenience, indicated in italics in the figure). Alternatively, in case 2. shown in FIG. 3, the image manipulating section 324 may perform processing for changing, not the color of the text, but the color of the entire image 103' of the sticky note 103.

In the original document 101 shown in the left side of FIG. 5, the lowermost sticky note 103 is placed to mask an upper right portion of the mark 102. In this case, when the mask determining section 323 likewise determines the mask pattern (case 3. shown in FIG. 3 (the sticky note overlapped with the upper right portion of the mark)), the image manipulating section 324 manipulates the read image of the original document 101 into an image in which, as shown by a lowermost image 103' of the set of images 101' in the right side of FIG. 5, a graphic image or characters representing the string "???" are added next to the text "Plan to Buy a Vase on August 12" read as the image of the sticky note 103.

For example, in a situation where a confirmer having confirmed a document (original document) prepared by a writer feeds back to the writer the document with a sticky note containing a comment of the confirmer and the writer takes necessary action with regard to the content of the feedback, for example, expresses on the document his/her decision after receiving the above confirmation, and gives further feedback to the confirmer, the processing described with reference to FIGS. 4 and 5 has desired effects.

For example, the confirmer receives from the writer an original document 101 in which an instruction to "Buy a PC" is described or prepares the original document 101 by printing a text file of the original document 101. The confirmer places, near the instruction on the document 101, a sticky note 103 in which a comment "Plan to Buy a PC" is described. In doing so, the confirmer makes a mark 102 next to the sticky note 103, for example, just to the left thereof, by hand or image formation. The original document 101 at this time corresponds to the original document 101 shown in the left side of FIG. 4.

The original document 101 with the sticky note 103 placed thereon in the above manner is returned to the writer. The writer takes necessary action according to the comment described on the sticky note, i.e., the action of expressing his/her decision after receiving the above confirmation, by re-placing the sticky note 103 on the original document 101. The original document 101 at this time corresponds to the original document 101 shown in the left side of FIG. 5. In transmitting the original document 101 with the sticky note 103 re-placed thereon, for example, via e-mail or facsimile, when the writer uses the document reading section 5 to allow it to read the original document 101, the image 101' shown in the right side of FIG. 5 is generated by the processing from the mark recognizing section 521 to the image manipulating section 524. The writer can transmit the image 101' containing his/her own decision to the confirmer by simply moving the position of the sticky note 103 without actually describing his/her own decision.

In the case where in the example of FIG. 4 an operator having received a document from a writer of the document returns the document with his/her own opinion or response added thereto via e-mail or facsimile, when as shown in the original document 101 shown in the left side of FIG. 4 the operator makes marks 102, places, near the marks 102 on the document 101, sticky notes 103 with his/her own opinion or response written thereon, and uses the document reading section 5 to allow it to read the document 101, the image 101' shown in the right side of FIG. 4 is generated by the processing from the mark recognizing section 521 to the image manipulating section 524. The operator can transmit the image 101' containing his/her own opinion or response to the writer by readily describing his/her own opinion or response on the sticky notes 103 without the need to re-describe on the original document 101 itself the contents described on the sticky notes 103.

Although in the example of FIG. 4 the images of the marks 102 in the set of images 101' of the original document 101 are deleted, the images of the marks 102 may be left as they are. Thus, even if the original sheet of a document 101 having a sticky note 103 placed thereon is lost, the same thing as that a portion of the mark 102 on the original sheet of the document 101 is masked with the sticky note 103 can be achieved by printing the image 101' of the document 101 containing the image of the mark 102 and filling in the portion of the mark 102.

The mark used is not limited to a single type and a plurality of marks can be concurrently used on a single document. In this case, the manner of manipulating the image of the sticky note can be changed depending upon the type of mark.

In other cases, the image manipulating section 324 may delete the image 103' of the sticky note 103 from the set of images 101' of the original document 101. Thus, a now-unnecessary sticky note 103 can be made invisible to the user without digitizing it, resulting in improved user's convenience.

Furthermore, when the sticky note recognizing section 322 determines that the text data contained in the image 103' of the sticky note 103 represents a predetermined string indicating a mail address, for example, a string containing @ or a string containing .jp or .com, the control section 100 may allow its built-in e-mail transmission function to send the image 101' acquired by the reading of the original document 101 or a text or image showing a previously stored content by e-mail via the network interface section 91 to a computer 200 or the like corresponding to the address indicated by the text data contained in the image 103'.

Figure 6:
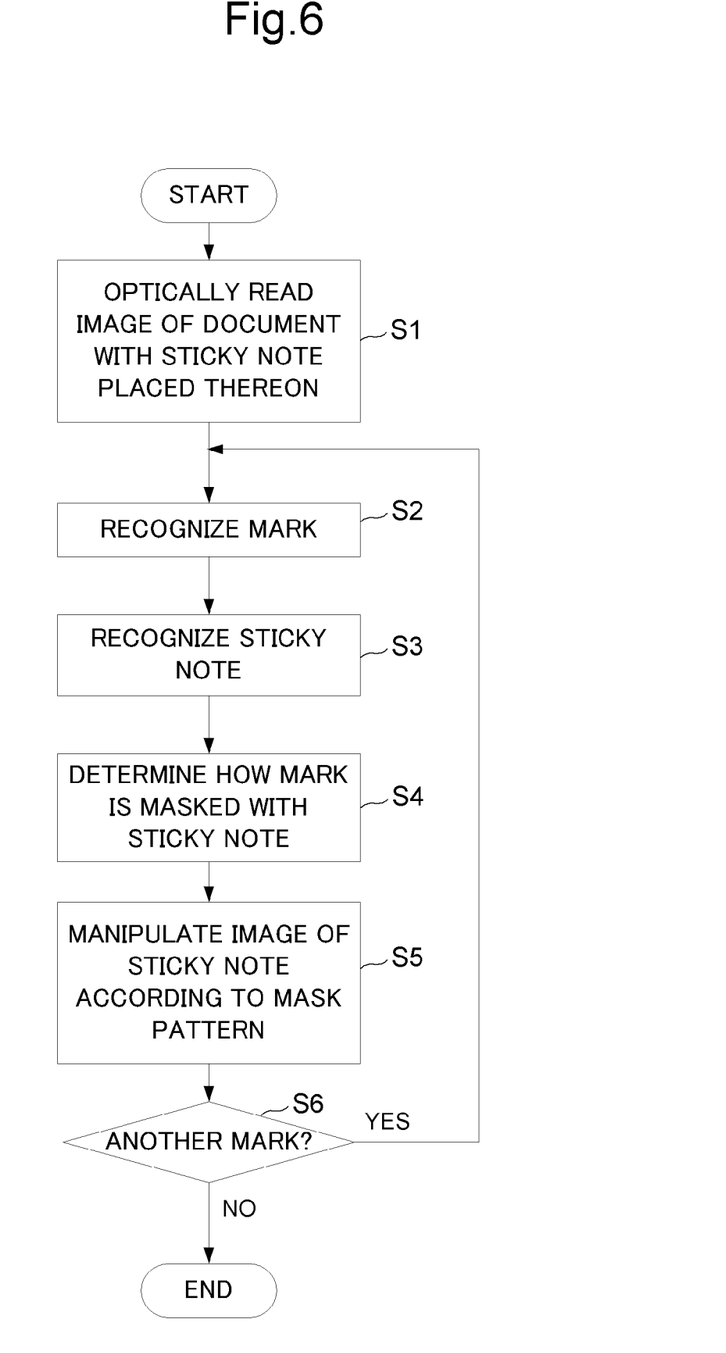
FIG. 6 is a flowchart of processing for digitizing an original document with one or more sticky notes placed thereon.

Next, a description will be given of processing for digitizing an original document with one or more sticky notes placed thereon in the image forming apparatus 1. FIG. 6 is a flowchart of the processing for digitizing an original document with one or more sticky notes placed thereon.

First, the document reading section 5 optically reads the image of an original document with one or more sticky notes placed thereon (S1). The read image is temporarily stored in the image memory 31.

The mark recognizing section 321 retrieves the image of the original document from the image memory 31 and recognizes the image of the predetermined mark made on the original document (S2).

The sticky note recognizing section 322 recognizes, in the image of the original document acquired by the above reading, the image of a sticky note placed on a predetermined position of the original document relative to the image showing the mark (S3).

The mask determining section 323 determines, based on the image of the mark recognized in step S2, how the mark is masked with the sticky note (mask pattern) (S4).

The image manipulating section 324 determines the content of image manipulation associated with the manner the mark is masked (the mask pattern) determined in step S4 and manipulates the image of the sticky note recognized in step S3 according to the determined content of image manipulation (S5).

If the mark recognizing section 321 has recognized an image showing another mark in the image of the original document (YES in S6), the process goes back to step S2, the image of the other mark is recognized, and the processing from S2 to S6 is repeated. On the other hand, if the mark recognizing section 321 has not recognized any images showing other marks in the image of the original document (NO in S6), the processing for digitizing the original document with the sticky note placed thereon is terminated.

As thus far described, according to this embodiment, in digitizing an original document with a sticky note placed thereon, the content showing the image of the sticky note can be manipulated differently depending upon how the sticky note is placed on a mark. Thus, the user can change the manipulation of the image of the sticky note, without rewriting information given to the sticky note, by simply changing the manner of placing the sticky note on the mark, resulting in improved user's convenience.

For example, in the technique, as described in BACKGROUND, in which the digitization of an original document with a sticky note placed thereon is performed by digitizing information given to the sticky note separately from the body of the document and sharing the digitized information among a plurality of persons, the sticky note to be digitized is required to contain check boxes representing various commands. In digitizing the document with the sticky note placed thereon, a document reading device can execute a designated command by reading the selected check box on the sticky note. However, in this case, the user needs to previously place a check mark in any of the check boxes on the sticky note. Furthermore, in correcting the command, the user needs to clear the check mark in the incorrect check box and place a check mark in the correct check box again. Therefore, the above conventional technique cannot sufficiently take advantage of the multiple detachment and reattachment capability of the sticky note.

In contrast to the above technique, according to this embodiment of the present disclosure, in digitizing an original document with a sticky note placed thereon, the user can easily change the manipulation of the image of the sticky note by simply changing the manner of placing the sticky note on the original document, resulting in improved user's convenience.

Although the embodiment of the present disclosure has thus far been described, the present disclosure is not limited to the above embodiment and can be modified in various ways. For example, although the description of the above embodiment is given taking a multifunction peripheral as an example of the image forming apparatus according to the present disclosure, the example is merely illustrative and the document reading device according to the present disclosure may be, for example, a scanner having no image formation function.

Furthermore, the structure and processing shown in the above embodiment with reference to FIGS. 1 to 6 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A document reading device comprising:
   a document reading section configured to optically read an image of an original document;
   an image memory configured to temporarily store the image read by the document reading section; and
   an image processing section configured to retrieve the image of the original document from the image memory and process the image, wherein
   the image processing section comprises:

a mark recognizing section configured to recognize an image of a predetermined mark made on the original document;

a sticky note recognizing section configured to recognize an image of a sticky note placed on a predetermined position of the original document relative to the mark;

a mask determining section configured to determine in which mask pattern the mark is masked with the sticky note; and an image manipulating section configured to manipulate the image of the sticky note according to the mask pattern determined by the mask determining section.

2. The document reading device according to claim 1, wherein the image manipulating section is configured to delete the image of the mark.

3. The document reading device according to claim 1, wherein the image manipulating section is configured to convert the image of the sticky note into characters, place the converted image of the sticky note next to the image of the mark, and delete the image of the mark.

4. The document reading device according to claim 1, wherein the image manipulating section is configured to add a predetermined character or graphic image to the image of the sticky note.

5. The document reading device according to claim 1, wherein the image manipulating section is configured to enclose the image of the sticky note by a line.

6. The document reading device according to claim 1, wherein the image manipulating section is configured to add the color of the image of the sticky note.

7. The document reading device according to claim 2, wherein the image manipulating section is configured to delete the image of the sticky note.

8. The document reading device according to claim 1, wherein the image manipulating section is configured to differently manipulate the image of the sticky note according to different mask patterns determined by the mask determining section.

9. The document reading device according to claim 8, wherein the mask determining section is configured to determine that the mark is masked with the sticky note in different mask patterns depending upon different positions or sizes of masking of the mark with the sticky note, and the image manipulating section is configured to perform predetermined different manipulations on the image of the sticky note for the different mask patterns determined by the mask determining section.

10. The document reading device according to claim 1, wherein the sticky note recognizing section is configured to recognize text data contained in the image of the sticky note and send an e-mail to a mail address indicated by the text data.

11. An image forming apparatus comprising a document reading device and an image forming section, wherein the document reading device comprises:

a document reading section configured to optically read an image of an original document;

an image memory configured to temporarily store the image read by the document reading section; and an image processing section configured to retrieve the image of the original document from the image memory and process the image, the image processing section comprises:

a mark recognizing section configured to recognize an image of a predetermined mark made on the original document;

a sticky note recognizing section configured to recognize an image of a sticky note placed on a predetermined position of the original document relative to the mark;

a mask determining section configured to determine in which mask pattern the mark is masked with the sticky note; and an image manipulating section configured to manipulate the image of the sticky note according to the mask pattern determined by the mask determining section, and the image forming section is configured to form an image on a recording medium using the image of the original document read by the document reading device.

* * * * *